United States Patent
Guo et al.

(10) Patent No.: US 7,398,312 B1
(45) Date of Patent: Jul. 8, 2008

(54) METHOD AND SYSTEM FOR CACHING STREAMING MULTIMEDIA ON THE INTERNET

(75) Inventors: Katherine H. Guo, Eatontown, NJ (US); Markus A. Hofmann, Tinton Falls, NJ (US); Sanjoy Paul, Marlboro, NJ (US); Tze Sing Eugene Ng, Pittsburgh, PA (US); Hui Zhang, Pittsburgh, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/538,351

(22) Filed: Mar. 29, 2000

(51) Int. Cl.
G06F 15/173 (2006.01)
G06F 15/16 (2006.01)
G06F 12/00 (2006.01)
G06F 13/00 (2006.01)
G06F 13/28 (2006.01)

(52) U.S. Cl. .................. 709/226; 709/225; 709/231; 711/118

(58) Field of Classification Search .......... 709/200, 709/223, 217–219, 226; 375/354–358; 725/86–153; 711/118, 161, 154
See application file for complete search history.

(56) References Cited

U.S. PATENT DOCUMENTS

| | | | | |
|---|---|---|---|---|
| 5,550,577 A | * | 8/1996 | Verbiest et al. | 725/92 |
| 5,586,264 A | * | 12/1996 | Belknap et al. | 725/115 |
| 5,805,821 A | * | 9/1998 | Saxena et al. | 709/231 |
| 5,940,391 A | * | 8/1999 | Malkin et al. | 370/390 |
| 6,029,195 A | * | 2/2000 | Herz | 725/116 |
| 6,061,720 A | * | 5/2000 | Kamel et al. | 709/219 |
| 6,199,076 B1 | * | 3/2001 | Logan et al. | 715/501.1 |
| 6,209,787 B1 | * | 4/2001 | Iida | 235/381 |
| 6,317,795 B1 | * | 11/2001 | Malkin et al. | 709/246 |
| 6,331,859 B1 | * | 12/2001 | Crinon | 345/619 |
| 6,377,972 B1 | * | 4/2002 | Guo et al. | 709/201 |
| 6,381,314 B1 | * | 4/2002 | Walinski | 379/101.01 |
| 6,438,579 B1 | * | 8/2002 | Hosken | 709/203 |
| 6,484,199 B2 | * | 11/2002 | Eyal | 709/223 |
| 6,647,417 B1 | * | 11/2003 | Hunter et al. | 709/225 |
| 6,708,213 B1 | * | 3/2004 | Bommaiah et al. | 709/226 |
| 6,728,760 B1 | * | 4/2004 | Fairchild et al. | 709/217 |
| 6,978,348 B2 | * | 12/2005 | Belknap et al. | 711/118 |

OTHER PUBLICATIONS

U.S. Appl. No. 60/177,786, filed Jan. 2000, Eyal, Aviv.*
MP3.com, (Top 40) www.mp3.com, Aug. 6, 2003, MP3.com.*
Yahoo! Inc., (Top 100) http://launch.yahoo.com/musicvideos/lists/top.asp, Aug. 6, 2003, Yahoo! Inc.*

* cited by examiner

Primary Examiner—Nathan J. Flynn
Assistant Examiner—David E England

(57) ABSTRACT

An apparatus and method to enhance existing caches in a network to better support streaming media storage and distribution. Helper machines are used inside the network to implement several methods which support streaming media including segmentation of streaming media objects into smaller units, cooperation of Helper machines, and novel placement and replacement policies for segments of media objects.

8 Claims, 5 Drawing Sheets

STREAMING MEDIA (SM) OBJECT

| LOCAL SERVER CACHE 22 | REMOTE CACHE 23 | REMOTE CACHE 24 | CONTENT SERVER 14 |
|---|---|---|---|
| 2,3,4,7,8,9 | 1,2,5,6 | 1,3,5,6,7,8,9,10 | 1,2,3,4,5,6,7,8,9,10 |

CACHE STORAGE TABLE

METHOD AND SYSTEM FOR CACHING STREAMING MULTIMEDIA ON THE INTERNET

BACKGROUND OF THE INVENTION

1. Field of the Invention

The present invention relates to network systems, and particularly to public network systems, such as the Internet. More particularly, the invention relates to methods which improve the caching of streaming multimedia data (e.g., audio and video data) from a content provider over a network to a client's computer.

2. Description of the Related Art

Computer networks such as the Internet are increasingly being used to transmit multimedia data (e.g., audio and video data). In the network-based context, one simple model of producing the information involves the client requesting the downloading of the multimedia data. Once downloaded, the client may then consume, or present, the information. This model is relatively easy to implement, however, it is non-optimal in that the client is required to wait for the downloading to complete before the presentation can begin. This delay can be considerable.

A more sophisticated model of producing information involves a content server at one network site streaming the multimedia information over the network to a client at another site. The client begins to present the information as it arrives (i.e., just-in-time rendering), rather than waiting for the entire data set to arrive before beginning the presentation. At the client computer, the received data is buffered into a cache memory and continuously processed as soon as, or soon after, being received by the client. The advantage of streaming is that the client computer does not have to wait until all the data is downloaded from the server before some of the data is processed and the multimedia output is created.

An example of multimedia data streaming is found in the Real player that is available over the Internet at Universal Resource Locator ("URL") http://www.real.com The Real audioplayer continuously sends audio data over the Internet from a server computer to the client computers. The audio data is buffered and processed by the client computers while the data is being sent. The client computers process the data by creating an audio output from the audio data.

Applications, such as the Real audioplayer, have conditioned computer network users to expect instantaneous streaming data on demand. The Internet, however, is often unable to deliver streaming data. This inability is most pronounced for video data. The inability to deliver streaming data on demand is due in part to the fact that live and on-demand streaming multimedia (SM) objects are generally delivered over the Internet and other data networks via unicast connections. This architecture has many shortcomings, both from the content provider's point of view and the user or recipient's point of view. From the content provider's point of view, he is faced with a server load that increases linearly with the number of clients. That is, each additional client requesting streaming multimedia data imposes an additional burden upon the content provider to meet the increased demand. From the Internet Service Provider's (ISP's) point of view, streaming multimedia under a unicast architecture poses network congestion problems. From the client's point of view, there is often long delays between the time the video content is requested by a client and the time when the video content actually begins playing (i.e., high start-up latency). In addition to the high start-up latency there also exists unpredictable playback quality due to network congestion.

Web caching has been extensively implemented on the Internet to reduce network load (i.e., bandwith consumption), server load, and high start-up latency. The utilization of Web caching on the Internet has been extensively studied. For a more detailed discussion of Web caching, see T, Bernesrs-Lee, A. Lutonen, and H. F. Nielsen Meyr, Cern httpd: http://www.w3.org/Daemon/Status.html, 1996; and C. M. Bowman, et al. Harvest: "A scalable, customizable discovery and access system" Technical Report CU-CS-732-94, Dept. of Computer Science, University of Colorado, Boulder, USA, 1994 both references are incorporated by reference herein. See also, D. Wessels, "ICP and the squid cache", National Laboratory for Applied Network Research, 1999, http://ir-cache.nlanr.net/Squid; this reference is also incorporated by reference herein. However, current caching systems, like those described above, are restricted to support static web objects such as HTML documents or images. Static web objects are typically small and as such are always cached in their entirety. Current caching methods, therefore, do not adequately support streaming multimedia data (i.e., web objects) such as video and audio SM objects. Streaming multimedia data like video objects, for example, are usually too large to be cached in their entirety. A single, two hour long MPEG movie, for example, requires about 1.4 Gbytes of disk space. Given a fixed investment in disk space, only a few streams could be stored at a cache, thus, decreasing the hit probability and the efficiency of the caching system. A natural solution would be to break video objects into smaller pieces for the purpose of caching. This solution is deficient, however, in that existing caching systems will treat different chunks from the same video object independently, while it might be desirable to consider the logical relationship among the various pieces.

SM objects can be generally differentiated from static web objects in that SM objects consist of multimedia data whose transmission has temporal characteristics such that the transmission rate is explicitly regulated or else the data becomes useless. In addition, the size of SM objects is typically at least an order of magnitude or two larger than that of a static web object, and therefore, do not lend themselves to be cached in their entirety. Given that caches have finite disk space, it is not feasible to statically store more than a few complete SM objects. If there are several simultaneous requests for different SM objects, it is easy to show that the cache will be busy replacing one SM object with another resulting in significant performance degradation.

Based on the foregoing, there is a need for a system and method for enhancing current caching systems to support streaming multimedia over a public network system, such as the Internet.

SUMMARY OF THE INVENTION

Illustrative embodiments of the present invention present a novel architecture and methods for supporting high quality live and on-demand streaming multimedia on a public network system, such as the Internet. By using helper servers (HS), also referred to as a helper, which operate as caching and streaming agents inside the network, existing caching techniques are enhanced to better support streaming multimedia over the Internet. The HSs serve to implement several methods specifically designed to support streaming multimedia, including segmentation of streaming multimedia objects (SM objects) into smaller units (i.e., chunks), cooperation of the HSs, and novel cache placement and replacement policies of the constituent units (chunks) which make up the SM objects.

The HSs reduce a content provider's memory and processing requirements by reducing the server load. Further, the invention reduces congestion problems by not being constrained by the unicast architecture of the prior art. And, the invention, reduces the long delays between the time video content is requested by a client and the time when the video content actually begins playing (i.e., reduces high start-up latency).

BRIEF DESCRIPTION OF THE DRAWINGS

The foregoing features of the present invention will become more readily apparent and may be understood by referring to the following detailed description of an illustrative embodiment of the present invention, taken in conjunction with the accompanying drawings, where.

DETAILED DESCRIPTION OF THE PREFERRED EMBODIMENTS

This application is related to co-pending U.S. Pat. No. 6,708,213 filed on Mar. 29, 2000 by Ethendranath Bommaiah, Katherine H. Guo, Markus Hofmann, and Sanjoy Paul, having a common assignee; the contents of which are incorporated herein by reference.

To facilitate an understanding of illustrative embodiments of the present invention, it is advantageous to first consider the network operating environment of the present invention, as well as definitions relating to system architecture and operation.

Illustrative embodiments of the present inventive architectures, systems, and methods described herein focus on data streaming in global, worldwide public networks, such as the Internet. Those skilled in the art will recognize, however, that the present architectures, systems, and methods are applicable to a wide variety of data networks and applications. The following terms and definitions are used in the present disclosure.

Cache: a region in a computer disk that holds a subset of a larger collection of data.

Cache Replacement Policy: a policy which specifies which cache item(s) should be removed from the cache when the cache is full or nearly full.

Streaming multimedia object (SM object): a type of data whose transmission has temporal characteristics such that the data may become useless unless the transmission rate is regulated in accordance with predetermined criteria (e.g., audio and video files). Transmission can start at any point within the object and can be terminated by the receiver at any time.

Helper Server (HS): a HS, also referred to as a helper, is one of a plurality of servers in the network that provide certain value-added services. For example, a HS can provide caching services and/or prefetching services. HSs selectively cooperate and communicate SM objects (or segments of such objects) between and among each other and between content servers and clients. That is, the HS understands an SM object's transmission requirements and can behave, in some respects, like a content server.

Figure 1:
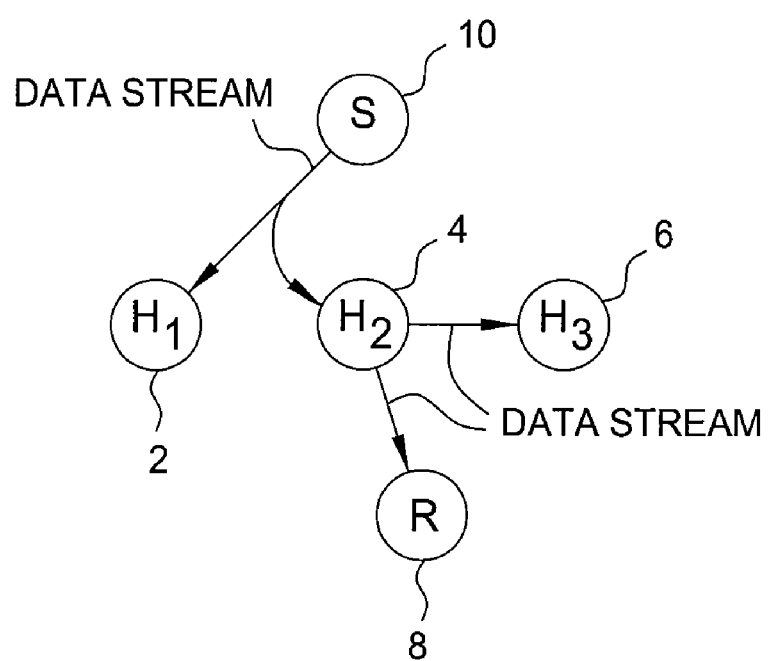
FIG. 1 is an illustration of a network system which include HSs in accordance with the present invention.

Data stream: a data stream transmits segments of a streaming multimedia object between elements in the network. The source might be the sender (i.e., the content provider) or a HS. Receiving hosts could be HS or receivers (i.e., clients). FIG. 1 illustrates several of the terms defined herein. Specifically, FIG. 1 shows an illustrative source 10 delivering a data stream directly to each of the HSs H1 (2) and H2 (4). H2 is further shown delivering a data stream to each of the HSs H3 (6) and receiver R (8). In general, the data stream from H2 to H3 need not be the same as that arriving at receiver R (8), but in this example the data stream from H2 to H3 is illustratively part or all of the same SM object transmitted by the data stream arriving at receiver R (8).

Streaming architectures in accordance with illustrative embodiments of the present invention support techniques to enhance caches to support streaming media over a public network system, such as the Internet. While caching is the traditional approach for improving scalability, it fails to scale in terms of object size and number of supported streams for streaming multimedia objects. In particular, existing solutions for streaming multimedia on the Internet have several shortcomings because these solutions use a separate unicast stream for each request, thus requiring a stream to travel from the server to the client across the Internet for every request.

To overcome these drawbacks and to further enhance the ability of existing caching systems to properly scale in terms of object size and number of supported streams, illustrative embodiments of the present invention advantageously combine two orthogonal mechanisms which are implemented via a novel system architecture to enhance existing caching systems. Briefly stated, the methods are: (1) novel cache placement and replacement policies of SM objects which address the issues of data representation (i.e., how SM object data is segmented for storage), and data distribution (i.e., how SM object data is distributed and communicated throughout the network), and (2) cooperation of HSs which address how the HSs (i.e., caching and streaming agents inside the network) communicate via a novel scalable state distribution protocol which directs requests to the most appropriate HS or the content server.

Figure 2:
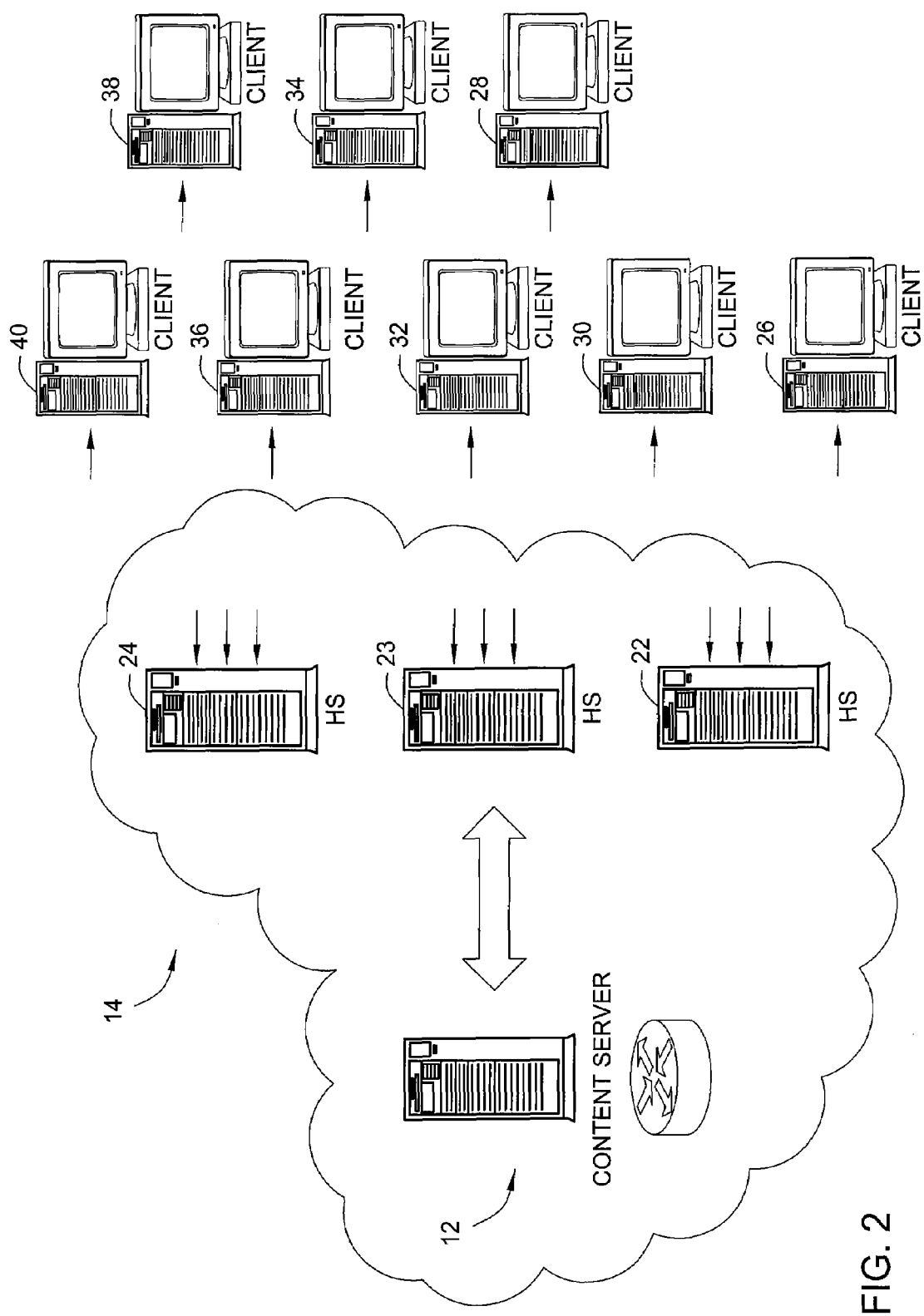
FIG. 2 is an illustration of a network system constructed according to one implementation of the invention.

An exemplary arrangement of using the invention is shown in FIG. 2 which illustrates a public network system. FIG. 2 further includes a server computer, as represented by content server 12, which stores and serves content over a network 14. The illustrative network 14 is a high-speed, high-bandwidth interactive distribution network, and can be representative of the Internet. The content server 12 serves content in the form of text, audio, video, graphic images, and other multimedia data. In the Internet context, the content servers might represent Web sites which serve or multicast content in the form of hypermedia documents (e.g., Web pages) to "client" computers, as represented by computers 26-40. The network further includes HS 22-24. Each HS 22-24 is configured as a conventional database server having processing capabilities, including a CPU (not shown) and storage. HSs 22-24 cache Internet resources, such as those requested by client computers 26-40 that have been downloaded from the content server 12 to allow localized serving of those resources. The interaction and cooperation of the above entities are further described below.

Cache placement and replacement policies form an integral part of a caching system for both static and streaming multimedia objects (SM objects). However, existing cache placement and replacement policies do not support SM objects well. The present invention defines several aspects which serve to support the cache placement and replacement policies associated with SM objects. They include a hotness rating associated with each SM object, data representation, and data distribution.

1. Helper Server Helper Hotness Rating

A first aspect for describing cache placement and replacement policies of the present invention is the helper hotness rating. Caching systems for SM objects attempt to reduce end-to-end delay, server load and network load by distributing the SM objects among the HSs 22-24 located closest to the clients 26-40. It is not feasible, however, to replicate all SM objects in all the HSs 22-24 in the network 12 due to limited disk space on the HSs 22-24. From the HSs' 22-24 point of view, given the limited disk space, a metric is required to identify those SM objects which are more frequently requested by clients 26-40 for cache storage at the HSs 22-24. A SM object is defined to be "hot" if a large number of client requests arrive at the HS 22-24 in a short period of time. Accordingly, each SM object is assigned a helper hotness rating at each HS 22-24 in the network at which the object is cached, defined by:

helper hotness rating=(total # of client requests for the SM object)/time span over which the requests are received at the HS (1)

This equation illustrates that high client demand for an SM object equates to a high helper hotness rating. The helper hotness rating is a local measure (i.e., local to the HS) representing how popular a SM object is among clients 26-40 served by that HS.

An exception exists where the client request history is not long enough to calculate a reasonable server hotness rating for a particular SM object. In such a case, a rating will be manually assigned to that object. Some objects can be reasonably predicted to be very hot, for example, the top 10 videos of the week, top news stories, and a video showing a NASA spacecraft landing on Mars.

In general, the role of the HSs 22-24 is to reduce network congestion by preventing client requests from going to the content server 12 whenever possible. In carrying out that responsibility, many client requests never reach the content server 12. As such, hotness as defined by equation (1) is an inappropriate metric for the content server 12. Accordingly, a more practical hotness metric, applicable to only the content server 12, is defined as:

$$\text{server hotness rating} = \sum_{\text{all } HSs} (\text{Helper hotness ratings}) = h_{server} \quad (2)$$

This equation states that, for a particular SM object, the content server metric for hotness is the sum of all the constituent helper hotness ratings for all HSs 22-24 in the network 14. That is, each HS 22-24 reports its local hotness rating to the content server 12 for inclusion in the general summation defined by Equation (2) to derive the server hotness rating.

The applicability of the helper and server hotness ratings will become more apparent in the context of the description provided below.

2. Data Representation/Segmentation

A second aspect for describing cache placement and replacement policies of the present invention is the segmentation of the SM objects. A major distinction between SM objects and regular (i.e., static) objects on the web is their size. The size of SM objects is typically an order of magnitude or two larger than the size of static objects. For example, a single, two hour long MPEG movie requires about 1.4 Gbytes of disk space. From the perspective of a system designer, two design options are presented. A first design option is to store SM objects in their entirety at the HSs 22-24. This solution is deficient, however, in that, given the limited disk space at the HSs 22-24, only a small percentage of SM objects could be stored at the HS 22-24 at one time. A second design option proposes breaking the SM objects into smaller segments, and treating these segments as special web objects observing their temporal relationship. An exception to this approach, might be to store SM objects defined to be very hot in their entirety.

Notwithstanding the exception for storing very hot objects in their entirety, a SM object will generally be segmented at the HSs 22-24 to better utilize the HSs' cache storage capacity. As an illustration, assume a representative HS 22-24 has a static cache storage whereby the minimal storage allocation unit of the static cache storage is a disk block of size S. In accordance with the object segmentation approach of the present invention, the SM object is divided into multiple chunks where each chunk is made up of a fixed number of segments. The chunks which make up the SM object can then be cached and replaced independently, thereby significantly increasing the utilization of the cache storage.

As a further consideration in the segmentation of SM objects, each segment of a SM object has a starting playback time and an ending playback time inter-relating the various segments which make up a SM object. In addition, client requests for SM objects contain an explicit starting and ending playback time. Thus, when an SM object request arrives at a HS, a simplistic hit/miss determination associated with classical web caching is inadequate. A SM object request will likely result in the client receiving some number of segments of the SM object from more than one HS 22-24. This not only increases signaling cost, but also increases the probability of losing synchronization. Therefore, it is preferable to cache successive segments of an SM object at a particular HS rather than caching a sequence of disjointed segments having multiple gaps.

Figure 3A:
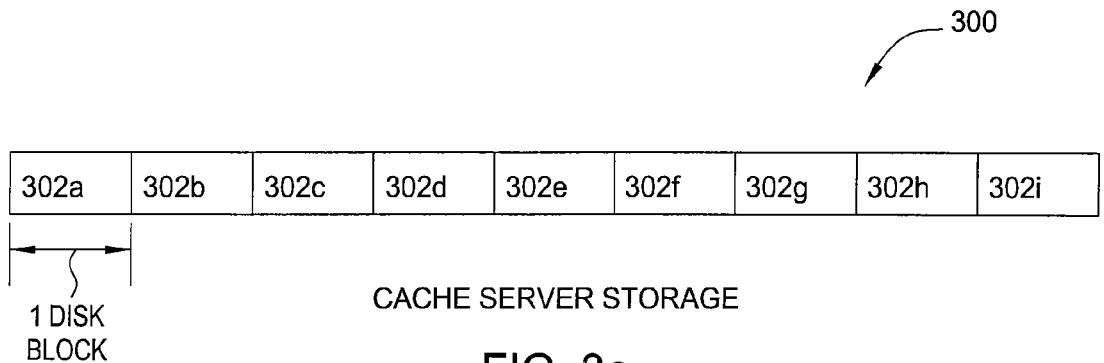
FIG. 3a is a block diagram of the construction of a cache according to the prior art.
Figure 3B:
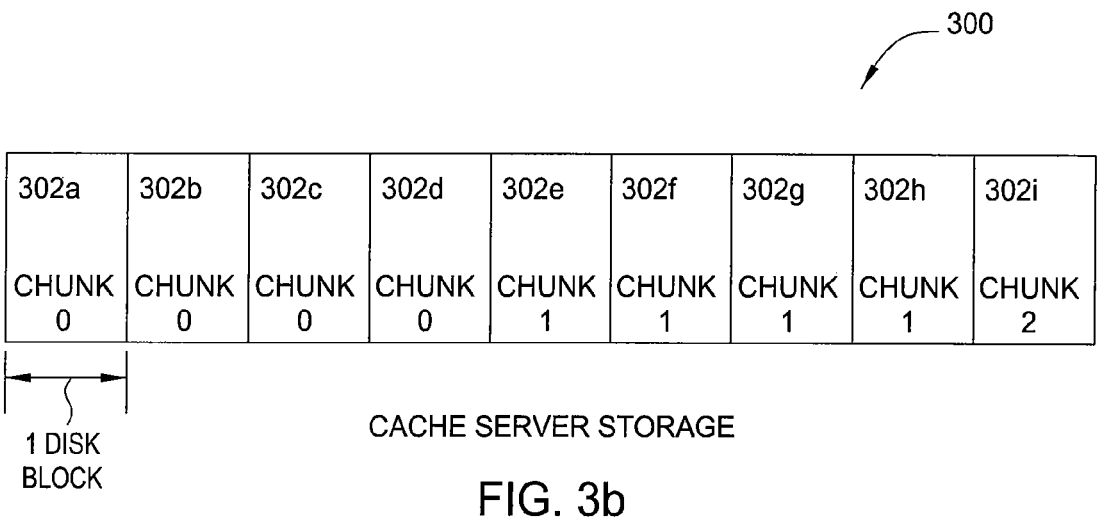
FIG. 3b is a block diagram of the construction of a cache according to an embodiment of the invention.

FIG. 3a shows a block diagram of a cache storage 300 of a representative HS 22-24 in the network. The cache storage 300 is shown to be made up of a plurality of contiguous disk block units 302a-302i, each unit being of a fixed size, S. The cache storage 300 may also be viewed as being logically divided into chunks in accordance with the data segmentation and storage principles of the present invention. For purposes of illustration, a chunk is selected to be four times (4×) the fundamental disk block unit S, as illustrated in FIG. 3b. As shown, chunk[0] is made up of disk blocks 302a-302d, and chunk[1] is made up of disk blocks 302e-h.

When an SM object is received at a HS 22-24, disk blocks are allocated on demand. Given that SM objects are represented in chunks, caching begins at the first available chunk at the HS 22-24. For example, assuming that disk block 302a represents the first available storage location at the HS 22-24. The first chunk of the received SM object, Chunk [0], will be allocated to disk block segments 302a-302d. When the chunk boundary is reached, i.e., 302d, caching begins at the next disk block 302e. That is, chunk [1] of the SM object will be allocated to disk block 302e-302h. It is noted that a chunk of an SM object chunk may not always be cached to its chunk boundary because an SM object stream can terminate at any time.

In practice, allocating cache storage in accordance with the principles of a chunk size influences the size and number of gaps in an object. Dividing the cache storage into larger chunk sizes increases the probability of blocking where blocking is defined as the inability of being able to store a new SM object at the HS when the disk space is full. Alternatively, dividing the SM object into smaller chunks increases the probability of creating gaps, i.e., non-contiguous stored chunks, at an HS. In either case, it may be necessary for a client to get all the constituent segments of a SM object from more than one HS 22-24. To do so, some form of intelligent pre-fetching is required which pre-fetches subsequent segments while a current segment is being streamed to the client.

3. Data Distribution

A third aspect for describing cache placement and replacement policies of the present invention is data distribution. Data distribution encompasses two distinct sub-aspects. A first sub-aspect refers to how data is distributed between the various communicating elements (i.e., content server 12, HSs 22-24, and clients) in the network 14, as will be described with reference to the following placement policies (1) server push—where the content server 12 pushes popular multimedia SM objects to a plurality of HSs 22-24, (2) helper pull—where each HS 22-24 individually pulls popular SM objects from the content server 12, and (3) demand driven—where clients 26-40 request SM objects from particular HS caches and HS 22-24 in turn passes the request to the content server 12.

The second sub-aspect of data distribution pertains to how data is stored on disk, which is embodied in two approaches, a deterministic approach and a random approach, and which is discussed in detail below.

3.a Server Push

Server push describes a first cache placement policy associated with the data distribution aspect. Studies have shown that access patterns for static objects follows a Zipf like distribution. See, for example, L. Breslau, P. Cao, L. Fan, G. Phillips, and S. Shenker. "Web caching and zipf-like distributions: Evidence and implications", Proceedings of IEEE Infocom >99, March 1999 New York, N.Y. Zipf's law states that for a given set of static objects, the probability that a request is for an object with a rank r is inversely proportional to r, defined as:

$$P=K(1/R) \qquad (3)$$

The above result may be intuitively extended to access patterns for SM objects, defined by:

$$P=E(1/R) \qquad (4)$$

Equations (3) and (4) state that for objects, both static and streaming, having the highest rank, their associated probability of request will also be high. It therefore follows that requests for popular objects (i.e., those having a high probability of request) are likely to come from many clients. An intuitive response to this result is to distribute the objects having a high probability of request to many HSs 22-24 in the network 14. This prior art approach is referred to as a rank-based approach and is successfully applied in the case of static objects. However, while the rank-based approach is a non-optimal solution for both static and SM objects. By definition, the rank-based approach requires periodic recalculation of the rank r as SM objects are added and deleted at the content server 12. In the case of SM objects, deletions and additions at the content server 12 necessitate a periodic recalculation of the rank r of the remaining objects, which results in a continuous redistribution of the fraction of HSs 22-24 the SM objects are distributed to. Accordingly, the rank-based approach of the prior art proves unstable. To reduce this instability for SM objects, the present invention uses a category-based approach.

The category-based approach is characterized, not by an objects rank r, as applied in the rank-based approach, but rather by a server hotness rating, $h_{server}$, maintained by the server for each SM object it is hosting. The hotness rating $h_{server}$ can be manually assigned or collected from HSs 22-24 in the network 14, as defined by equation (2) above. Based on the SM objects hotness rating at the server, $h_{server}$, the content server 12 assigns the SM object to one of four categories: cold, warm, hot, and very hot as follows:

SM object is cold, if its server hotness rating, $0 \leq h_{server} < R_1$; warm, if its server hotness rating, $R_1 \leq h_{server} < R_2$; hot, if its server hotness rating, $R_2 \leq h_{server} < R_3$; very hot, if its server hotness rating, $R_3 \leq h_{server}$, where $0 < R_1 < R_2 < R_3$ are input parameters.

The category-based approach is advantageous for SM objects in that object category assignments are made strictly on the basis of the server hotness rating, independent of the SM object's dynamically changing rank, thereby reducing the instability associated with the prior art rank-based approach.

The category-based ranking approach of the present invention, defines what fraction of the HSs 22-24 an SM object is to be multicast to. The category-based based ranking approach is embodied in two ways: a category-based whole object server push approach (WOSP), and a fractional object server push approach (FOSP). Each of which will be described in detail below.

The WOSP approach is given by the following: an SM object is multicast to a fraction $a_1$ of the HSs, if the SM object is ranked cold; an SM object is multicast to a fraction $a_2$ of the HSs, if the SM object is ranked warm; an SM object is multicast to a fraction $a_3$ of the HSs, if the SM object is ranked hot; an SM object is multicast to a fraction $a_4$ of the HSs, if the SM object is ranked very hot, where $a_1$-$a_4$ are provided as input parameters and $0 <= a_1 < a_2 < a_3 < a_4 < 1$.

As an illustrative example of the WOSP approach, assume parameters $a_1$-$a_4$ are input as $a_1=\frac{1}{8}$, $a_2=\frac{1}{4}$, $a_3=\frac{1}{2}$, and $a_4=1$. Accordingly, very hot objects would be multicast to all HSs 22-24 in the network (e.g., $a_4=1$), hot objects would be multicast to one half of all HSs 22-24 in the network (e.g., $a_3=\frac{1}{2}$). It is noted that the fraction of HSs 22-24 selected for multicast distribution is made randomly in the preferred embodiment, however other methods for determining which HSs to distribute to are within the scope of the present invention.

As previously stated, the category ranking (i.e., very hot, hot, warm, cold) of an SM object depends only on its server hotness rating. Therefore, adding and deleting SM objects at the content server 12 will not affect an existing SM object's server hotness ranking leading to enhanced stability over prior art methods.

In the FOSP approach, all SM objects are multicast to all HSs 22-24 in the network. However, only a fraction of the SM object is multicast as determined by the object's category label. It should be noted that the storage requirements of the fraction-based server push approach is equivalent to the category-based server push approach described above. This is apparent by considering that an equivalent amount of storage is required to store an SM object in its entirety in 1/q of the HSs 22-24 as is required to store 1/q of the SM object in all the HSs 22-24. In practice, it is common for a client to start streaming video from its beginning and then lose interest and tear down the connection. Therefore, storing only a fraction of the SM object in accordance with the fraction-based server push approach better utilizes disk resources.

In the FOSP approach, the fraction of the SM object to be distributed to all HSs 22-24 in the network is determined by the object's category label, given as follows: if an SM object's rank is cold then a fraction $a_1$ of the SM object is multicast to all HSs; if an SM object's rank is warm then a fraction $a_2$ of the SM object is multicast to all HSs; if an SM object's rank is hot then a fraction $a_3$ of the SM object is multicast to all HSs; if an SM object's rank is very hot then a fraction $a_4$ of the object is multicast to all HSs, where $0 \leq a_1 < a_2 < a_3 < a_{4 \leq 1}$ are input parameters.

As an illustrative example of the FOSP approach, assume parameters $a_1$-$a_4$ are input as $a_1=\frac{1}{4}$, $a_2=\frac{1}{3}$, $a_3=\frac{1}{2}$ and $a_4=1$. Accordingly, very hot objects are distributed in their entirety (e.g., $a_4=1$), only the first half of hot objects are distributed (e.g., $a_3=\frac{1}{2}$), only $\frac{1}{3}$ of warm objects are distributed (e.g., $a_2=\frac{1}{3}$), and only one quarter of cold objects are distributed (e.g., $a_1=\frac{1}{4}$).

It is further contemplated that the WOSP and FOSP category-based approaches discussed above may be used in combination, whereby a content server 12 would multicast a fraction a of each object, in accordance with WOSP approach, to a fraction β of the HSs in accordance with the FOSP approach, where both α and β depend on the SM object's hotness rating.

3.b Helper Pull

Another cache placement and replacement policy associated with data distribution is helper pull. In helper pull, each HS 22-24 in the network 14 independently requests SM objects from the content server 14 based on the SM object's popularity. Further, each HS 22-24 assigns and maintains a helper hotness rating for each SM object. Each SM object is then classified at the HS in accordance with its helper hotness rating (i.e., cold, warm, hot, very hot).

The helper pull approach is preferably implemented as a category based fractional object (FOHP) approach. In accordance with the FOHP approach, each HS 22-24 in the network 14 requests only a fraction of the SM object from the content server 12. It is important to note that in the present approach each HS independently requests SM objects from the content server 12, as distinguished from server push where decisions to stream SM objects to the HSs 22-24 are made by the content server 12. In the present approach, the fraction of the SM objects requested by the HSs 22-24 is determined by the object's helper hotness rating, defined as follows: a HS requests a fraction $a_1$ of an SM object, if the SM object is ranked cold; $a_2$ of an SM object, if the SM object is ranked warm; $a_3$ of an SM object, if the SM object is ranked hot; and $a_4$ of an SM object, if the SM object is ranked very hot, where $0 \leq a_1 < a_2 < a_3 < a_4 \leq 1$. For example, setting $a_1=\frac{1}{4}$, $a_2=\frac{1}{3}$, $a_3=2$, and $a_4=1$ implies very hot objects are requested in their entirety, only the first half of each hot object is requested, and so on.

3.c Demand Driven

A third cache placement and replacement policy associated with the aspect of data distribution is referred to as demand driven. In the demand driven approach, clients 26-40 request SM objects from certain HSs 22-24 in the network. The HSs 22-24 which serve the requests cache the objects along with passing them to the clients. Each objects category identifier (i.e., cold, warm, hot, very hot) is used in a category based fractional object demand driven (FODD) approach, where the fraction from the beginning of the object cached at a HS is determined by the category identifier, defined as follows: a HS caches a fraction $a_1$ of an SM object, if the SM object is ranked cold; $a_2$ of an SM object is cached, if the SM object is ranked warm; $a_3$ of an object is cached, if the SM object is ranked hot; $a_4$ of an object is cached, if the SM object is ranked very hot, where $0 \leq a_1 < a_2 < a_3 < a_4 \leq 1$.

3.d Deterministic vs. Random

The first aspect of the data distribution metric, discussed above, focused on how SM objects are distributed amongst the various communicating elements in the network. The second aspect of data distribution concerns how SM objects are stored and replaced on disk at each HS 22-24 in the network 14, upon receiving an SM object. This aspect of data distribution is implemented in accordance with two approaches: a deterministic approach and a random approach, which are discussed hereinbelow.

In general, given that SM objects are made up of chunks, the chunk is used as the fundamental cache placement and replacement unit to illustrate the principles of the deterministic and random approaches. Within each chunk, a prefix caching principle is adhered to. That is, when a chunk is allocated, it is filled starting from the lowest order constituent segment which comprises that chunk. For example, referring again to FIG. 3b, the constituent segments of chunk[0] will be allocated in the following order: segment 302a represents the lowest order segment and will be filled first followed by segments 302b, 302c, and 302d. Further, when a chunk of an SM object is selected to be overwritten, the chunk content is replaced from the end of the chunk on a segment-by-segment basis. Referring to FIG. 3b, chunk[0] would be replaced segment-by-segment from the highest order segment to the lowest order segment as: 302d, 302c, 302b, and 302a.

When an SM object is streamed to a HS 22-24, it is stored on disk chunk-by-chunk, continuously from the beginning of the SM object. Since a stream can be torn down at any time, the last chunk might be only partially filled. Further, each stored SM object has an associated last access time recorded, to determine, among other things, the least recently used stored SM object. Each stored SM object will also have associated therewith an "in use" indicator, whereby if any chunk of an SM object is in use, the entire SM object will have an "in use" status.

In the deterministic approach, two methods are considered for overwriting chunks on a HS disk when there is insufficient disk space available. A first method is to choose the Least Recently Used (LRU) SM object, as indicated by the value of the last access time, for replacement in successive chunk units starting from the end of the SM object. Further, within each chunk, prefix caching is implemented as described above.

A second method identifies a number of candidate SM objects to form a victim set, whereby the highest order chunks of the victim set are overwritten in a round robin fashion whenever an available cache entry is needed. Accordingly, newer SM objects replace a set of older SM objects by simultaneously replacing the end portions of the older SM objects, thereby leaving the prefixes of as many SM objects in the cache as possible.

Several approaches for forming the victim set include: choosing a number of SM objects that are least recently used, choosing a set of SM objects whose helper hotness ratings are below a certain threshold, and choosing SM objects that are labeled either cold or warm by the HS. Other methods, not explicitly described herein may also be used to form the victim set. In the case where it is determined that there is insufficient disk space available and no chunks belonging to other SM objects can be removed, the HS simply ignores the incoming SM object.

An advantage of the deterministic approach is that each SM object is always stored in continuous fashion, without gaps. However, if any chunk of the SM object is in use, then the entire SM object is considered to be in use, thereby precluding any part of the SM object from being removed.

A second approach pertaining to the data distribution metric regarding how SM objects are stored on disk is the random method. In the random method when a SM object is streamed to a HS, a number of chunks are randomly selected to be stored on disk. In addition, the last access time for each SM object is recorded. In contrast to the deterministic approach, if a particular chunk of an SM object is in use, only that chunk is marked in use, as opposed to the entire SM object.

A primary objective of the random approach is to distribute chunks evenly to HSs 22-24 in the network 14 to minimize the amount of requests sent to the content server 12. SM objects (i.e., SM objects) may be generally classified as being globally or locally popular SM objects. Globally popular SM objects are expected to be popular in the future among all clients. Therefore, it is desirable to distribute their chunks evenly to all HSs 22-24 in the network 14. For locally popular SM objects, which are popular among a certain set of clients, it is desirable to distribute their chunks to only a subset of the HSs 22-24 that are close to the interested clients.

The random approach may be implemented in a number of different embodiments. A first embodiment employs the principles of server push, described above. In the server push random approach, it is assumed that for each globally popular SM object, the sender multicasts the entire SM object as a succession of chunks to all HSs 22-24 in the network 12. Each HS 22-24, however, does not cache the entire SM object on its disk, but rather employs a random algorithm to cache only certain chunks of the SM object. Further, each HS 22-24 keeps an estimate of the total number of HSs 22-24 in the system K, and upon receipt of streaming media object chunks, caches only a fraction of them that is proportional to 1/K.

The algorithm utilizes inputs K and A, where K represents the estimated size of the HS caching system, and A is a constant. The algorithm employs a random number generator with a uniform distribution between 0 and 1. Whenever a chunk arrives at a representative HS 22-24, a random number R is generated. In a preferred embodiment, the random number is generated by utilizing the IP address of the HS as the seed. If the random number R is between zero and P (i.e., if 0<R<P), where P=A/K then the chunk is cached, otherwise the chunk is ignored. The algorithm is given as follows: input: K is the estimated size of the HS caching system; A is a constant and $1 \leq A < K$; and P=A/K.

The total number of chunks to cache for each SM object at each HS is a function of the total number of HSs 22-24 in the system K. The total number of HSs 22-24 in the system, K, can be made assigned statically or measured dynamically. Based on the algorithm described above, if a representative HS estimates the total number of HSs 22-24 in the system to be K, then for a SM object having N constituent chunks, the representative HS would cache (A*N/K) chunks in accordance with the random server push algorithm.

A second embodiment of the random approach employs the principles of helper-pull. Recall that helper-pull is characterized by each HS 22-24 individually pulling popular SM objects from the content server 12. In the helper-pull random approach, a HS cluster is defined for a SM object as the set of HSs 22-24 that has requested and has cached the same media object. Each HS maintains an estimate of the size of the HS cluster K', and upon receipt of media object chunks, caches only a fraction of the chunks that is proportional to 1/K'. Thus, with high probability the entire object is cached chunk by chunk in a subset of the HS caching system. The algorithm is given as follows: input: K=is the estimated size of the HS cluster; T is the time when the beginning of the stream arrives at the HS; A is a constant and $1 \leq A < K'$, P=A/K'. Use T as the seed for a random number generator with normal distribution between 0 and 1. Whenever a chunk arrives; generate a random number R, and if 0<R<P then cache the chunk; otherwise, ignore the chunk.

The time T when the beginning of a stream arrives at each HS depends on user request patterns and therefore are uncorrelated. Each HS uses the arrival time T as the seed for its random number generator to guarantee that each HS does not cache an identical sequence of chunks, and to further ensure that the chunks are evenly distributed among all the HSs 22-24 requesting the SM object.

The helper-pull random approach is advantageous, as compared to the server push random approach in that popular SM objects (i.e., SM objects that are popular among certain clients) are only distributed to HSs 22-24 serving those clients.

If each HS had an infinite amount of disk space, the chunks of SM objects have a high probability of being evenly distributed among all HSs in the network. However, as a practical matter, each HS has only a limited amount of disk space. As such, a cache replacement method is needed to guarantee that the chunks which comprise the SM objects are evenly distributed when existing chunks on the disk are frequently replaced. One method, contemplated by the present invention, combines the principles of a least recently used replacement method (LRU) with a randomized algorithm. In accordance with the method, each stored SM object has an age parameter associated with it indicating the most recent access time, as is performed in the LRU method. As previously stated, each clip is comprised of a plurality of chunks, and each HS in the network stores some subset of these chunks. If a chunk is requested by a client, then only that chunk is marked in use and cannot be purged from the disk. When a new SM object arrives at an HS, and new disk space is required, the present method determines which chunks to replace. The method operates by first finding a set of SM objects whose associated age parameter is above a certain threshold. For each SM object in the set, the chunks which comprise the SM objects are randomly replaced with chunks from the incoming SM object stream.

4. Co-Operation of HSs

Upon receiving a request for an SM object, a HS 22-24 decides where to get the requested data. This method is referred to as helper selection. The objective of the helper selection method is to find an optimal sequence of cache accesses in order to service the request. The HS 22-24 could, for example, get portions of the SM object, or the entire SM object, from its own local cache. Alternatively, the HS 22-24 could obtain the requested data directly from the server, or from the cache of any other HS 22-24 that is able to service the request. In general, a HS 22-24 could receive the requested data from multiple sources or from a single source (e.g., the server). One way to find an optimal sequence of cache accesses is to determine all possible sequences and assess them before any data is streamed. This solution requires a look-ahead in time, which is not viable in the context of streaming media because the content of caches may change during the time interval in which a complete cache sequence is being calculated. Further, a data stream might be interrupted at any time by performing VCR operations such as stop, pause, forward, and rewind. The unpredictability of user behavior may necessitate the re-calculation of an optimal sequence. A preferred solution for finding an optimal sequence of cache accesses is to use a step-wise approach. The method employing the step-wise approach finds the lowest cost cache currently among all active HSs 22-24, in addition to the content provider 12, to service a client request for an SM object, using a minimum normalized cost function to be described. During each iteration of the method, an HS which receives the initial client request for an SM object looks internally to satisfy the request. If the request cannot be satisfied internally from the local server cache associated with the local HS, the local HS then looks to every other HS in the network and the content server to determine which server can satisfy the request at a minimum cost. Once the HS identifies a minimum cost server, the local HS retrieves as much data as there is in the identified server's cache up to the point where the HS can again service the request.

Figure 4:
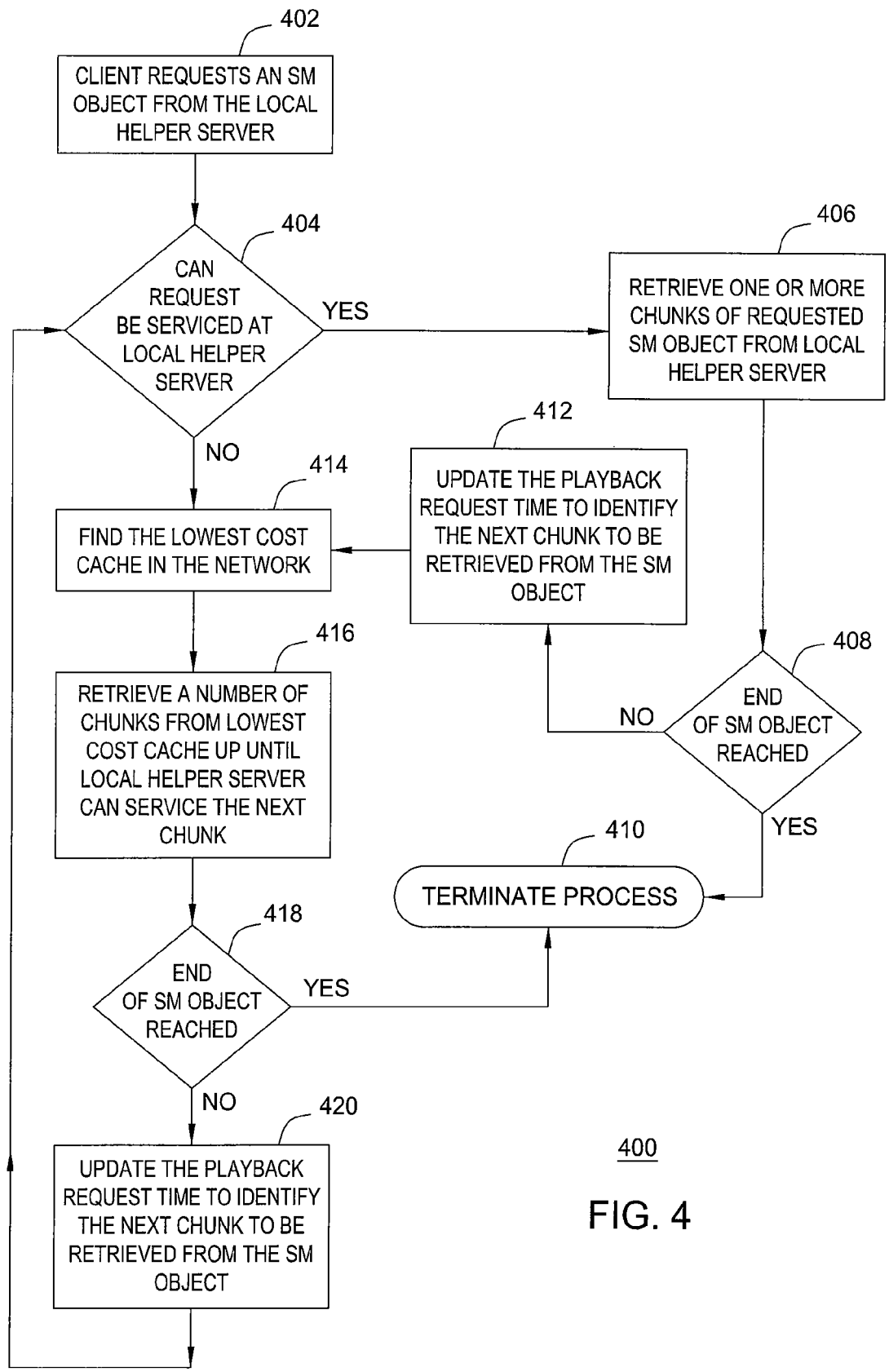
FIG. 4 is a flowchart illustrating the method of helper selection according to an embodiment of the present invention.
Figures 5A, 5B:
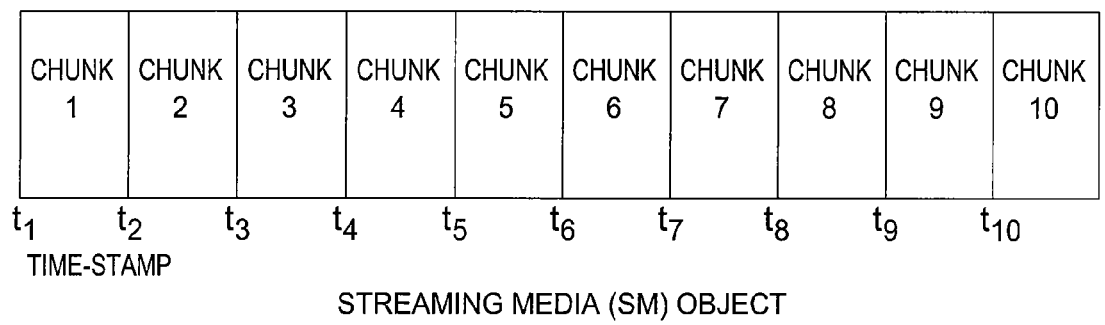
FIG. 5a is a block diagram of an SM object segmented according to an embodiment of the present invention.
FIG. 5b is a table illustrating cache storage of various elements in the network.

FIG. 4 is a flow chart of the method for finding an optimal sequence of cache accesses to satisfy a client request for an SM object. Reference shall also be made to FIGS. 6a and 6b. FIG. 6a is a representation of an SM object made up of a number of chunks where the i-th chunk has an associated time-stamp, $t_i$, for its starting time. FIG. 6b is a particular illustrative example of how the various chunks which make up a representative SM object may be stored throughout at the various entities throughout the network. As shown, chunks {1,2,3,4,7,8, and 9} of the SM object are stored at a local HS. Remote HS stores chunks {1,2,5, and 6}, etc . . . . The exemplary illustration of FIG. 6 is used to as an aid in the understanding of the method for finding an optimal sequence of cache accesses to satisfy a client request for an SM object, as described in FIG. 4.

Referring to FIG. 4, the method for finding an optimal sequence of cache accesses to satisfy a client request for an SM object begins at step 402 with a client 26 making a request for an SM object from its local HS 22 in the network 14. In the request, the client specifies a requested playback starting time, which may be the beginning of the object, $t_1$ (see FIG. 6a). In accordance with the method of the present invention, whenever a client request is received at a HS 22 that server will, as a first resort, attempt to satisfy the request locally from its own local cache. Only when a request cannot be satisfied internally will the HS 22 access a remote cache. Assuming the client requested the SM object from the beginning of the SM object, the local HS 22 would first look to its own cache to determine whether the first chunk having an associated time stamp equal to the requested playback starting time, $t_1$, resides there. If yes, then the HS 22 will retrieve the requested chunk having the associated starting time in addition to any additional chunks which are stored locally and follow in consecutive time order. Step 404 describes the step of looking first to the local cache of the HS. In the illustrative example of FIG. 6, the local HS 22 determines that chunks 1-4 may be retrieved locally, see step 406. It is then determined at determination step 408 whether the end of the SM object has been reached. If yes, the process terminates at step 410. Otherwise, the HS 22 then updates (i.e., advances) the playback request time in accordance with the last chunk retrieved from its local cache at step 412. In the present example the request time will be updated to reflect that the $5^{th}$ chunk is the next chunk to be retrieved at step 412. The $5^{th}$ chunk must be retrieved from one of the other HSs 23,24 in the network or the content server 12. Step 414 recites that a lowest cost cache will be identified in the network to retrieve the $5^{th}$ chunk. In accordance with the teachings of the present invention, a minimum normalized cost function is utilized to calculate the lowest cost cache currently among all remote HSs 23, 24 in the network, and the content server 12 to retrieve chunks remotely when they are not contained in the local cache (e.g., chunk 5). The cost function is generally denoted as min_normalized_cost (Union(S,C)), where S represents the content server 12, and C represents all HSs 22-24 in the network. The details of how the cost function is calculated will be explained in detail further below.

In accordance with one embodiment of the present invention, an HS is determined to be eligible for selection as a minimum cost cache if that cache stores at least M chunks of the SM object stream in its local cache, having a starting time equal to the updated playback request time. The value of M may be a static value or determined dynamically in each iteration. It should be noted that while the HS 22 requires that eligible remote server caches have at least M chunks of the SM object available to be retrieved, the HS will not necessarily retrieve all M chunks. That is, a HS 22 will always retrieve a chunk from its own internal cache if it can do so. To further illustrate this point, referring to FIG. 6, HS 24 is identified in the present iteration of the method as being a minimum cost cache having at least M chunks, i.e., chunks 5-10, where M=5 has been predetermined. That is, in the present iteration the cost function computed for HS 24 was determined to be a minimum cost function as compared with all other servers in the network (i.e., HS 23 and content server 12). In the present example, remote HS 24 will return chunks 5 and 6, which are not cached locally at HS 22. Although chunks 7-10 are available from the cache of HS-24, those chunks are retrieved locally at HS 22 since they are available there. That is, although HS 24 satisfied the criteria of caching at least the next 5 required chunks, only two chunks, chunks 5 and 6 were actually retrieved from HS 24. This is recited in the flowchart at step 416.

The process then continues at step 418 to determine if the end of the SM object has been reached. If yes, the process terminates at step 410, otherwise the playback request time is updated in accordance with the last chunk retrieved at step 420 and the next iteration begins at step 404.

In determining an appropriate cost function to determine a lowest cost cache at each iteration, a large number of cost factors could be taken into consideration. However, considering a multitude of cost factors adds unnecessary complexity to the system. A reasonable alternative solution is to define a subset of useful indices and to specify a good heuristic to find an optimal solution according to user requirements. In defining useful and practical cost functions that attempt to strike a balance between network and HS system load associated with using a static or dynamic cache, two cost factors must be considered, network load and system load. Network load is discussed in detail in U.S. application Ser. No. 09/537,270, filed on Mar. 29, 2000 by Katherine H. Guo, Markus Hormann, Sanjoy Paul, Tze Sing Eugene Hg, Hui Zhang, and having a common assignee; the contents of which are incorporated herein by reference.

4.b System Load

The second cost factor to be considered in defining a useful and practical cost function to determine a lowest cost cache among all active HSs is the system load. It is desirable to evenly distribute load among the HSs and to avoid overloading popular HSs. A good indicator of the current processing load at a system is the total number of incoming and outgoing streams. Accordingly, this data is included in the system's advertisement messages. Each HS has a maximum number of streams it can serve concurrently. When the number of streams served is much less than the capacity limit, serving one additional stream has little impact on performance. However, when the system is operating close to its capacity, serving one additional stream will degrade performance significantly. Accordingly, the system load cost should increase very little for a low load and increase sharply for a high load. Therefore, the load cost L for requesting a stream from an HS or the content server is defined as follows: L=1, if the cache is local; and if the cache is remote, L=maxload/(maxload−current load) where current load is the current load at the HS or the content server, and the max load is the maximum allowable load for the HS or the content server. It should be noted that load cost is minimized for a local cache because it does not incur any additional load at another HS or the content server.

The normalized cost function for using a cache is defined as the cost of getting a single segment from that cache. Using the two cost factors defined above (i.e., N and L, where N is the network cost and L is the load cost), the normalized cost is defined as follows: $f = N \times L$.

It is important to note that, the cost function is minimized for a local cache solution (i.e., servicing the request entirely at the receiving HS), in which case both N and L are one. As a result, whenever a local cache solution is available, it will be used. The algorithm is given as follows:

input: a playback request tStart = start playback time of request;

done = false;

while not(done) do
   S = server;
   C = list of all caches in known HSs with more than M chunks of the SM object after tStart;
   soln = min_normalized_cost (union(S,C));
   Request as much data from soln as possible, up to the point where more data for the object exists in local cache;
   if (End of SM object is reached) then
     done = true
   else
     tStart = end playback time of request sent to soln;
     Sleep for the playback duration or request sent;
     continue;
   end
od While the invention is susceptible to various modifications and alternative forms, specific embodiments thereof have been shown by way of example in the drawings and have been described in detail. It should be understood, however, that it is not intended to limit the invention to the particular forms disclosed, but on the contrary, the intention is to cover all modifications, equivalents and alternatives falling within the spirit and scope of the invention as defined by the appended claims.

What is claimed is:

1. A method for caching streaming multimedia (SM), comprising:
   calculating a helper hotness rating at a helper server (HS) for each of a plurality of SM objects that are hosted at a content server connected to the HS in a network, each helper hotness rating being a total number of client requests for a particular SM object divided, by a time period during which the client requests are received;
   categorizing each SM object into one of a plurality of helper hotness categories based on the calculated helper hotness rating; and
   pulling, for each SM object, a fraction of the SM object by the HS from the content server, said fraction being determined according to the helper hotness category, the HS caching the fractions of each SM object for distribution to a plurality of clients, the HS being interposed between the content server and the clients.

2. The method of claim 1, further comprising:
   calculating a helper hotness rating at each of a plurality of helper servers (HSs) for each of a plurality of SM objects that are hosted at a content server connected to the HSs in a network, each helper hotness rating being a total number of client requests for a particular SM object divided by a time period during which the client requests are received;
   calculating a server hotness rating at the content server for each SM object, each server hotness rating for the particular SM object being a sum of the calculated helper hotness ratings received from all of the HSs;
   categorizing each SM object into one of a plurality of server hotness categories based on the calculated server hotness rating; and
   pushing each SM object from the content server to a fraction of HSs, each fraction being determined according to the server hotness category, the HSs caching the fractions of each SM object for distribution to a plurality of clients, the HSs being interposed between the content server and the clients.

3. The method as recited in claim 1, wherein pulling by said HS is in response to client requests.

4. The method as recited in claim 1, wherein a deterministic cache placement and replacement policy is implemented at the HSs.

5. The method of claim 1, wherein a random cache placement and replacement policy is implemented at the HSs.

6. The method as recited in claim 2, wherein pushing by said content server is in response to client requests.

7. The method as recited in claim 2, wherein a deterministic cache placement and replacement policy is implemented at the HSs.

8. The method of claim 2, wherein a random cache placement and replacement policy is implemented at the HSs.

\* \* \* \* \*